United States Patent [19]
Rabe et al.

[11] Patent Number: 5,794,070
[45] Date of Patent: Aug. 11, 1998

[54] METHOD AND APPARATUS FOR FAST DMA TRANSFER ON AN INDUSTRY STANDARD ARCHITECTURE (ISA) BUS

[75] Inventors: Jeffrey L. Rabe, Gold River; Dave Smyth, Rocklin; David D. Lent, Placerville; Sathyamurthi Sadhasivan, El Dorado Hills; Dahmane Dahmani; Stephen T. Rowland, both of Folsom; James S. Coke, Cameron Park; Mitchell W. Dale, Sacramento, all of Calif.

[73] Assignee: Intel Corporation, Santa Clara, Calif.

[21] Appl. No.: 730,777

[22] Filed: Oct. 16, 1996

Related U.S. Application Data

[63] Continuation of Ser. No. 603,690, Feb. 20, 1996, abandoned, which is a continuation of Ser. No. 85,968, Jun. 30, 1993, abandoned.

[51] Int. Cl.[6] .................................................. G06F 13/00
[52] U.S. Cl. ........................ 395/842; 711/100; 395/845; 364/DIG. 1; 364/242.3; 364/DIG. 2
[58] Field of Search ................. 364/DIG. 1, DIG. 2, 364/427, 842, 845, 242.3; 711/100

[56] References Cited

U.S. PATENT DOCUMENTS 5,111,425  5/1992  Takeuchi et al. .......................... 395/425
5,297,242  3/1994  Miki ......................................... 395/425

*Primary Examiner*—Tod R. Swann
*Assistant Examiner*—Tuan V. Thai
*Attorney, Agent, or Firm*—Blakely, Sokoloff, Taylor & Zafman

[57] ABSTRACT

A computer system comprises a direct memory access (DMA) transfer unit and a plurality of DMA devices coupled by an external bus. The DMA transfer unit effectuates DMA transfers for the plurality of DMA devices. The DMA transfer unit contains a DMA controller, a bus arbiter, and a bus controller. The DMA controller and the bus controller generate a two-clock cycle DMA transfer. To effectuate a two-clock cycle DMA transfer, a requesting DMA device sets-up a DMA transfer with the DMA controller such that a DACK# signal is asserted during a first clock period. During a second clock period, the DMA controller sets-up the memory address. During a third clock period, the bus controller transitions a command signal on the external bus. Upon assertion of the command signal, valid data is asserted on the external bus. For demand and block mode operations, additional DMA transfers are executed in a two-clock cycle DMA transfer. The DMA controller and the bus controller also generate a three-clock cycle DMA transfer.

26 Claims, 5 Drawing Sheets

5,794,070

METHOD AND APPARATUS FOR FAST DMA TRANSFER ON AN INDUSTRY STANDARD ARCHITECTURE (ISA) BUS

This is a continuation of application Ser. No. 08/603,690, filed Feb. 20, 1996, now abandoned, which is a continuation of application Ser. No. 08/085,968, filed Jun. 30, 1993 abandoned.

BACKGROUND OF THE INVENTION

1. Field of the Invention

The present invention relates to the field of data transfer in a computer system, and more particularly, to methods and apparatus for a two-clock cycle direct memory access (DMA) transfer.

2. Art Background

In order to integrate peripheral components, such as external memory cards, modems and storage devices, some computer systems utilize an open-ended architecture. The open ended computer architecture permits interfacing a number of peripheral components to the computer system. In general, computer systems comprise address, data and control buses to interface peripheral components with computer system resources. In order to interface peripheral components to a computer system via a bus, the computer bus comprises various bus specifications. For example, the computer bus specifications define the timing and voltage level for signals transmitted on the bus. Although defining a bus specification permits interfacing of peripheral devices, once the specification is defined, the specification can not be changed without losing compatibility with existing peripheral devices. However, it may be desirable to change the bus specifications because new technology permits an increased level of performance for bus interface specifications. Therefore, it is desirable to change bus specifications for interfacing new peripheral components while remaining compatible with existing peripheral components.

An industry standard architecture (ISA) bus specification and an extended industry standard architecture (EISA) bus specification define parameters for interfacing peripheral components with a computer system. A number of direct memory access (DMA) transfer timing cycles exist for interfacing peripheral components via a standard ISA or EISA bus. For example, the ISA bus specification supports a DMA cycle having cycle time equal to approximately 960 nano seconds (ns) per single cycle. The newer EISA bus specification supports the ISA compatible 960 ns cycle as well as faster DMA cycle timing, including a DMA burst mode having a cycle time equal to 120 ns, and two DMA transfer cycles having cycle times equal to approximately 720 ns and 480 ns. However, some peripheral components can not support a DMA transfer as fast as the 120 ns burst mode, but can support a DMA transfer faster than the 480 ns DMA transfer cycle. Therefore, it is desirable to provide additional timing cycles so that every peripheral component can be accessed at the maximum DMA transfer cycle speed supported by the particular peripheral component.

SUMMARY OF THE INVENTION

The present invention is implemented in a computer system comprising a direct memory access (DMA) transfer unit and a plurality of DMA devices coupled by an external bus. In a preferred embodiment, the computer system comprises an Intel® Corporation x86 microprocessor and memory connected by a peripheral component interconnect (PCI) bus, and the external bus comprises an industry standard architecture (ISA) bus. The DMA transfer unit effectuates DMA transfers for the plurality of DMA devices. The DMA devices may comprise I/O devices or memory devices in the computer system. In a preferred embodiment, the DMA devices comprise I/O devices allowing DMA transfer between memory on the PCI bus and I/O devices located on the ISA bus. The DMA transfer unit contains a DMA controller, a bus arbiter, and a bus controller. The bus controller generates a plurality of signals for control and operation of the external bus.

The DMA controller and the bus controller generate a two-clock cycle DMA transfer. To effectuate a two-clock cycle DMA transfer, a DMA device requests a DMA transfer by asserting a DREQ signal. Upon receiving a request for a DMA transfer, the DMA controller requests use of the external bus for the DMA transfer request. In order to receive use of the external bus, the DMA controller generates a transfer request for the bus arbiter, and the bus arbiter performs bus arbitration. When the requesting DMA channel wins arbitration, the DMA controller asserts a DACK# for the requesting DMA device during a first clock period. The DACK# identifies the DMA channel associated with the requesting DMA device. The DMA device receives the DACK# signal, thereby indicating allocation of the external bus to the requesting DMA device. The two-clock DMA transfer cycle is initiated by setting-up a memory address for the DMA transfer during a second clock cycle. In a third clock cycle, the IOW# or IOR# signal is asserted, and valid data is placed on the external bus. Therefore, the DMA transfer is effectuated on the third clock cycle with the assertion of the IOW# or IOR# command signal for a single DMA transfer. In a subsequent clock cycle, the bus controller transitions the IOW# or IOR# from the low level state to a high level state. If the DMA controller is programmed for block or demand mode, then subsequent two-clock cycle DMA transfers are executed.

The DMA controller and the bus controller also generate a three-clock cycle DMA transfer. The requesting of a DMA transfer and subsequent selection of an I/O device by the DMA controller for the three-clock cycle DMA transfer is the same as for the two-clock cycle DMA transfer. In a second clock cycle, the three-clock DMA transfer cycle is initiated by setting-up a memory address for the DMA transfer. In a third clock cycle, the IOW# or IOR# signal is asserted, and valid data is placed on the external bus. In a fourth clock cycle, the bus controller deasserts the command signal by transitioning the IOW# or IOR# from the low level state to the high level state.

If the DMA controller is programmed for block or demand mode, then in a fifth clock cycle, the IOW# or IOR# signal remains in a high level state before subsequent DMA cycles are executed.

BRIEF DESCRIPTION OF THE DRAWINGS

The objects features and advantages of the present invention will be apparent from the following detailed description of the preferred embodiment of the invention with references to the drawings listed below.

DETAILED DESCRIPTION OF THE INVENTION

The present invention discloses methods and apparatus for a two-clock cycle and a three-clock cycle direct memory access (DMA) transfers. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

Figure 1:
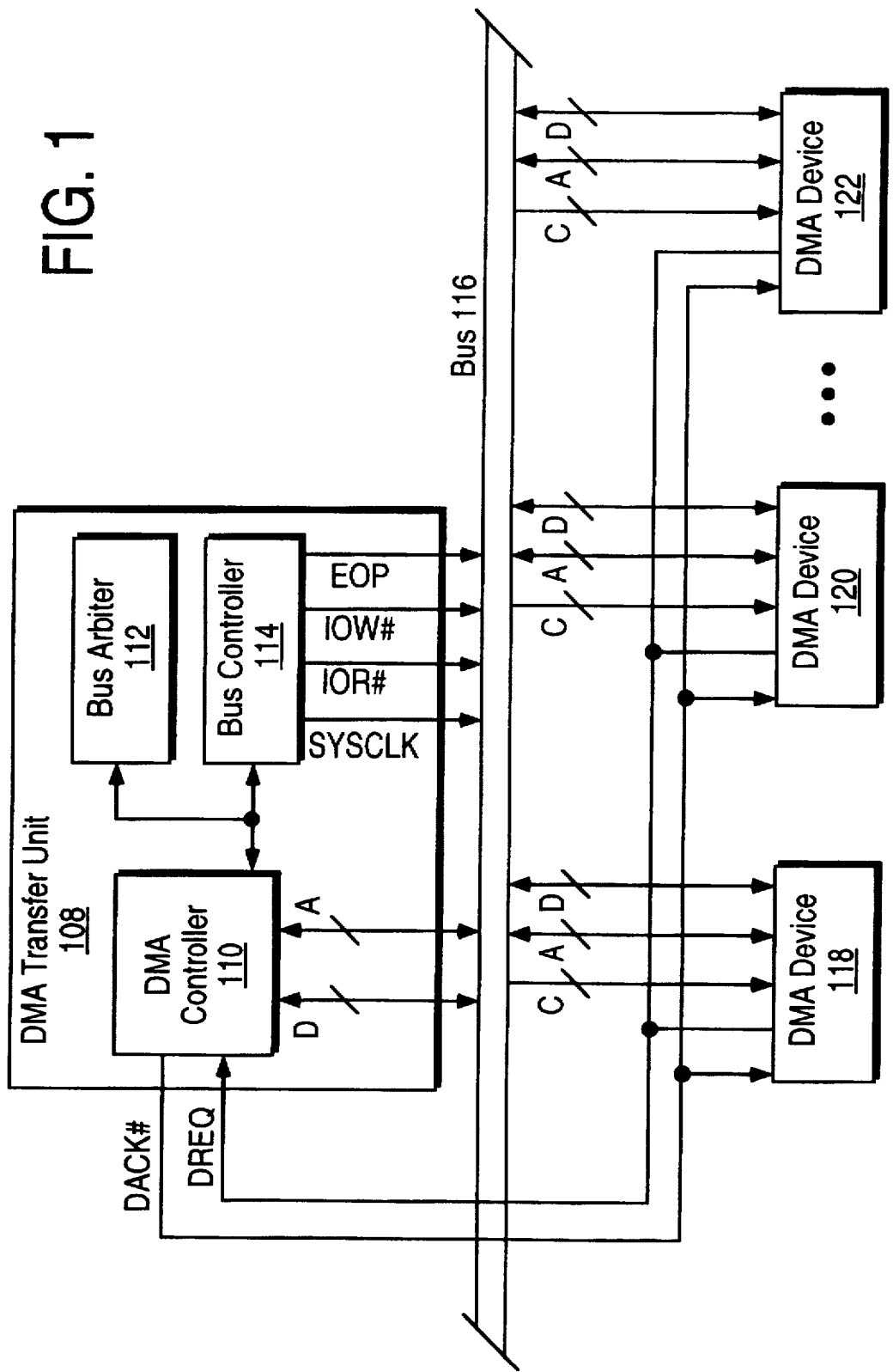
FIG. 1 illustrates a high level block diagram incorporating a DMA transfer sub-system configured in accordance with the present invention.

Referring to FIG. 1, a high level block diagram incorporating a DMA transfer sub-system configured in accordance with the present invention is illustrated. The DMA transfer sub-system contains a DMA transfer unit 108 and a plurality of DMA devices. The DMA transfer sub-system is part of a computer system comprising a central processing unit (CPU) and memory. Any computer system may be used to implement the DMA transfer subsystem of the present invention. A preferred embodiment including a more specific computer system is described below. The DMA transfer unit 108 effectuates DMA transfers for the DMA devices 118, 120 and 122. The DMA devices 118, 120 and 122 are connected to a bus 116. In a preferred embodiment of the present invention, the bus 116 comprises an ISA-compatible bus. The DMA devices may comprise I/O devices or memory devices. For example, DMA devices 118, 120, and 122 may comprise I/O devices that provide a number of functions such as memory, a mass storage device, and a modem. In a preferred embodiment, the DMA devices comprise I/O devices allowing DMA transfer between memory on an internal bus (not shown) and I/O devices located on the bus 116. The DMA transfer unit 108 contains a DMA controller 110, a bus arbiter 112, and a bus controller 114. The DMA controller 110 may consist of any DMA controller configured for the particular data transfer system. The bus controller 114 generates a plurality of signals for control and operation of the bus 116. The generation of a bus cycle on the bus 116 in accordance with the present invention is described more fully below. Similarly, the bus arbiter 112 may utilize any bus arbitration technique such as round robin, static priority, and first-come-first-serve, to allocate bus resources to DMA devices.

Figure 2:
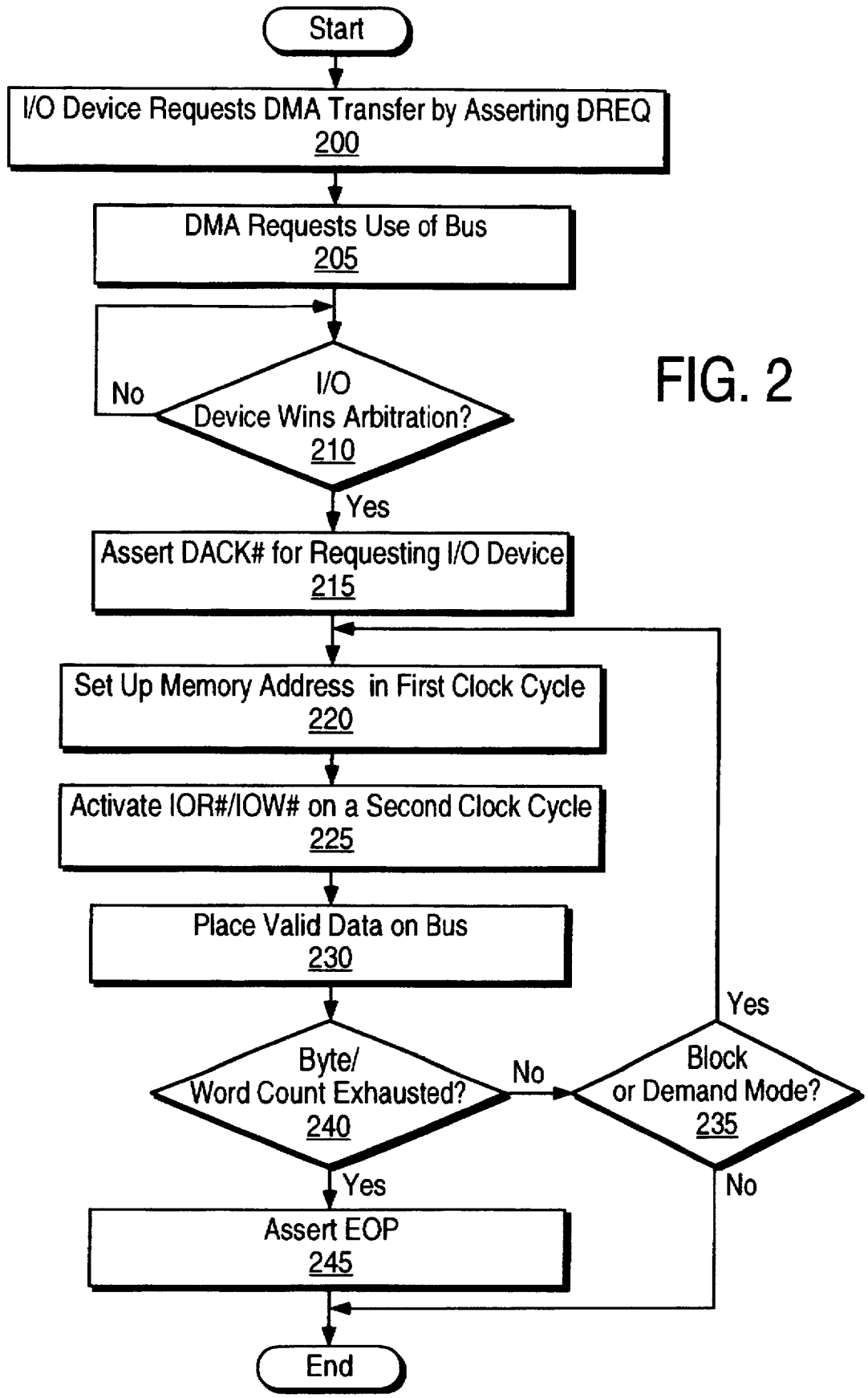
FIG. 2 illustrates a flow diagram for a method of a two-clock cycle DMA transfer configured in accordance with the present invention.
Figure 3:
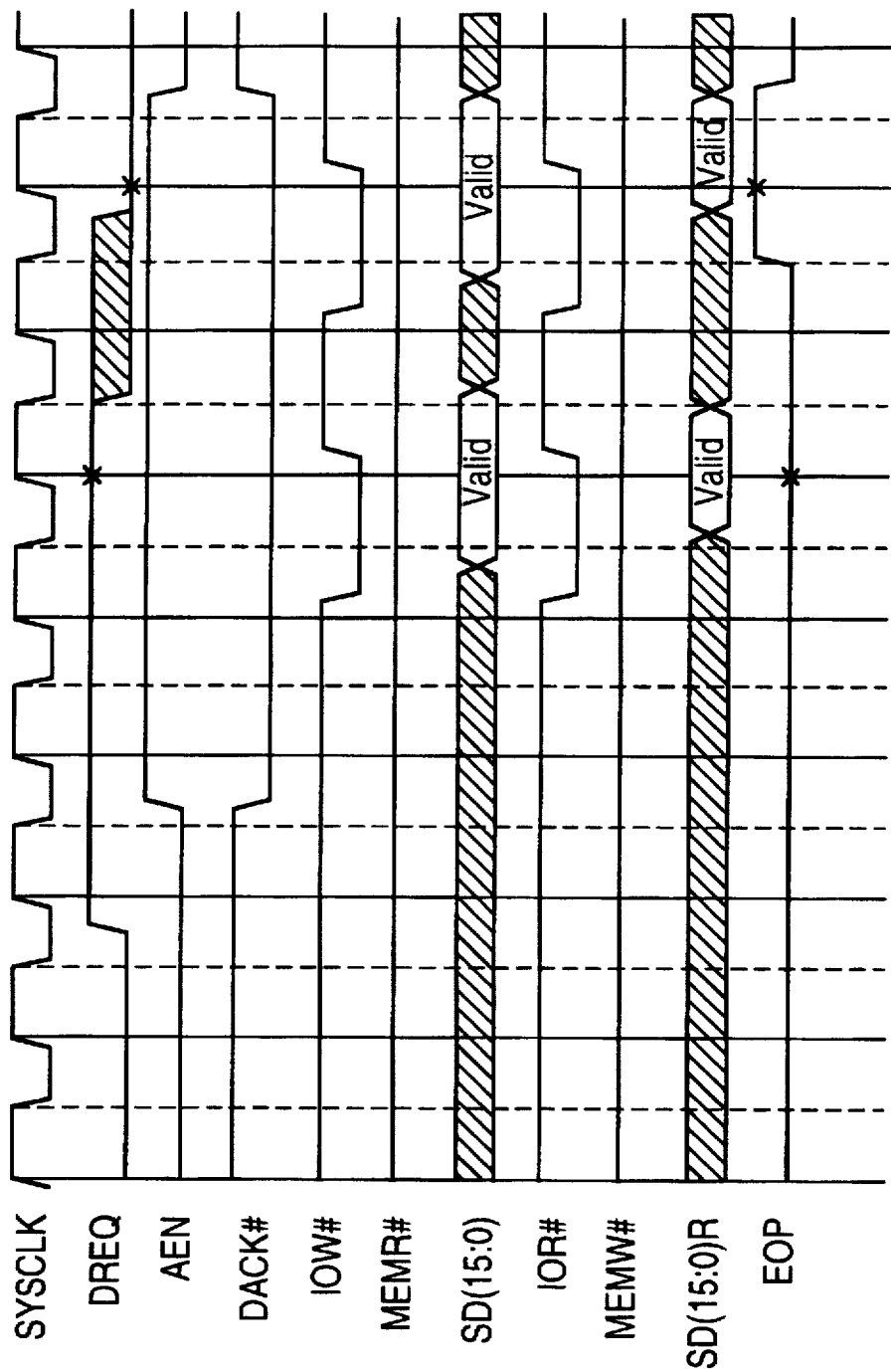
FIG. 3 illustrates a timing diagram for the two-clock cycle DMA transfer configured in accordance with the present invention.

The DMA controller 110 and the bus controller 114 of the present invention generate a two-clock cycle DMA transfer timing mode. In FIG. 2, a flow diagram for a method of a two-clock cycle DMA transfer configured in accordance with the present invention is illustrated. In FIG. 3, a timing diagram for the two-clock cycle DMA transfer is illustrated. With reference to FIGS. 2 and 3, the operation and protocol for the two-clock cycle DMA transfer will be described. In step 200 of FIG. 2, a DMA device requests a DMA transfer by asserting a DREQ signal. As shown in FIG. 3, the DREQ signal is active upon transition from a low level state to a high level state. Upon receiving a request for a DMA transfer, the DMA controller 110 requests use of the bus 116 for the DMA transfer request as shown in step 205. In order to receive use of bus 116, the DMA controller 110 generates a transfer request for the bus arbiter 112. The bus arbiter 112 performs bus arbitration in accordance with any of the arbitration schemes discussed above. When the requesting DMA channel wins arbitration, the DMA controller 110 asserts a DACK# for the DMA device in a first clock period for an initial DMA transfer cycle. The DACK# identifies the DMA channel associated with the requesting DMA device. The DMA device receives the DACK# signal, thereby indicating allocation of the bus 116 to the requesting DMA device.

The two-clock DMA transfer cycle sets-up a memory address during a second clock cycle as shown in step 220. The memory address identifies a memory device for the DMA transfer. The memory device may reside on either the bus 116 or an internal bus. A two-clock DMA transfer cycle wherein memory is located on a separate internal bus is described below. During the first and second clock cycles, the command signal IOW# or IOR# is de-asserted and remains in a high level state. The IOW# signal indicates a write operation to the I/O device, and the IOR# indicates a read operation to the I/O device. On a third clock cycle of the two-clock DMA transfer cycle, the bus controller 114 transitions the IOW# or the IOR# signal on the bus 116 from a high level state to a low level state as shown in step 225. If memory for the DMA transfer is located on the same bus, then MEMR#, for an I/O write, and MEMW#, for an I/O read, are generated. Upon assertion of the IOW# or IOR# signal, valid data is asserted on the bus 116 as shown in step 230.

Periods for valid data for read and write operations for the two-clock cycle DMA transfer are shown in FIG. 3 for a 16 bit ISA-compatible bus. In a subsequent clock cycle, the bus controller 114 transitions the IOW# or IOR# from the low level state to a high level state. If the DMA controller 110 is in block or demand mode, then subsequent two-clock cycle DMA transfers are executed. Specifically, on a fourth clock cycle, the bus controller 114 transitions the IOW# or the IOR# signal on the bus 116 from a low level state to a high level state. The fourth clock cycle may also be designated as a first clock cycle for a subsequent DMA transfer when the DMA controller is programmed for block or demand mode. Also during the fourth clock cycle, the DMA controller 110 sets-up a memory address. During a fifth clock cycle or second clock cycle for the additional DMA transfer, the bus controller 114 transitions the IOW# or the IOR# signal on the-bus 116 from a high level state to a low level state. Upon assertion of the IOW# or IOR# signal, valid data is asserted on the bus 116 for the additional DMA transfer.

The DMA transfer cycles are issued until the byte/word count is exhausted. The assertion of the EOP signal signifies the end of the DMA transfer. The DREQ and DACK# signals are then de-asserted.

If the bus 116 comprises an ISA-compatible bus, then during DMA cycles, the bus controller 114 drives the AEN (Address Enable) signal to a high level, thereby preventing the I/O device on the bus 116 from misinterpreting the DMA cycle as a valid I/O cycle. Also, the BALE (Bus Address Latch Enable) signal is driven high during DMA transfer cycles. The two-clock cycle timing is primarily for fast I/O devices, such as an IDE device. The two-clock cycle timing mode runs at 3 SYSCLK cycles, at 360 ns for a single cycle. In block or demand transfer mode, the two-clock cycle timing runs at 2 SYSCLK cycles, or 240 ns per cycle.

Figure 4:
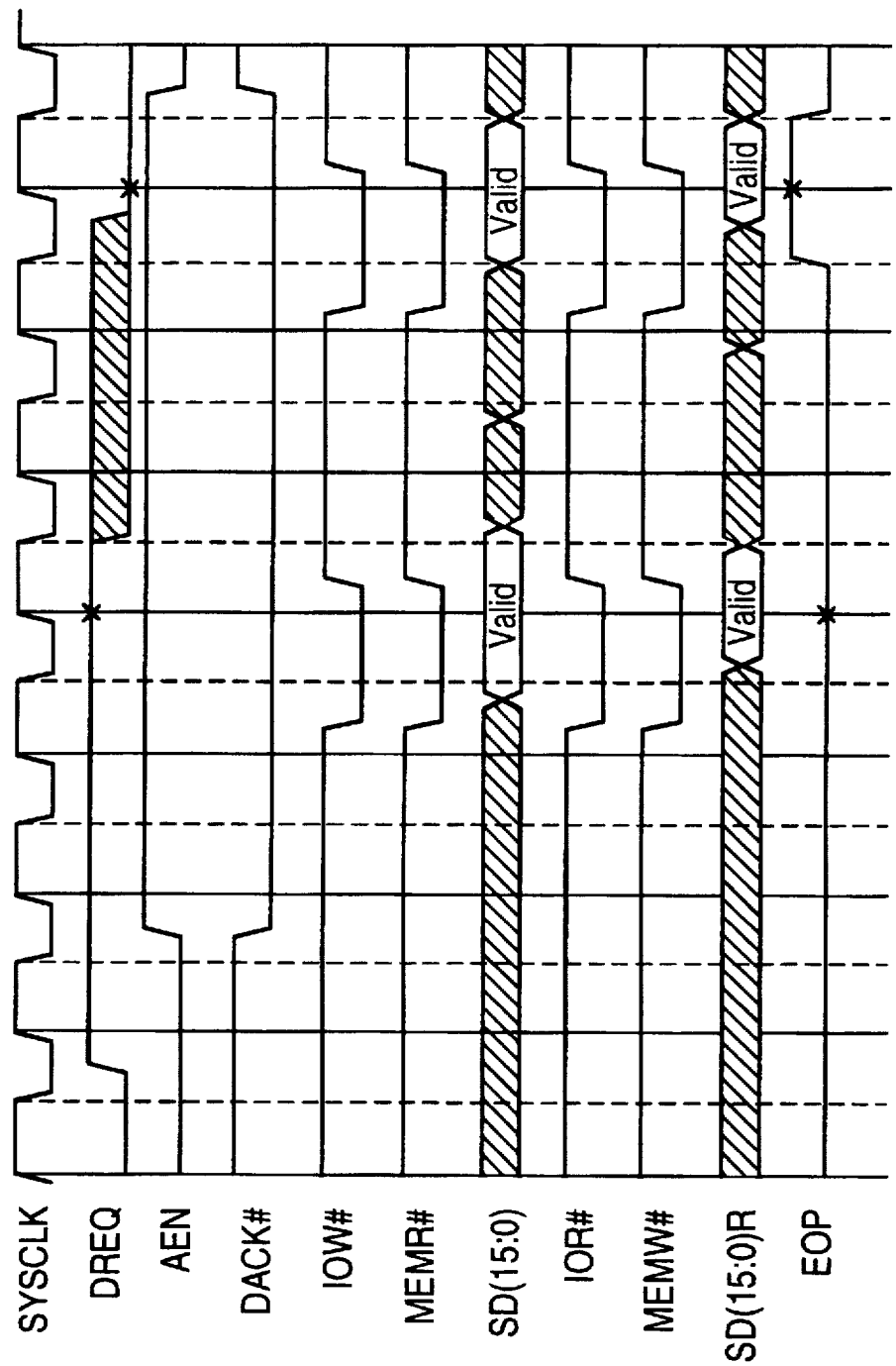
FIG. 4 illustrates a timing diagram for a three-clock cycle DMA transfer configured in accordance with the present invention.

Referring to FIG. 4, a timing diagram for a three-clock cycle DMA transfer configured in accordance with the present invention is illustrated. The requesting of a DMA transfer and subsequent selection of an I/O device by the DMA controller 110 for the three-clock cycle DMA transfer is the same as for the two-clock cycle DMA transfer. For a three-clock DMA transfer cycle, a memory address is set-up for the DMA transfer during a second clock cycle. On a third clock cycle of the three-clock DMA transfer cycle, the bus controller 114 activates the command signal by transitioning the IOW# or the IOR# signal on the bus 116 from a high level state to a low level state. Upon assertion of the IOW# or IOR# signal, valid data is asserted on the bus 116. Periods for valid data for read and write operations for the three-clock cycle DMA transfer are shown in FIG. 4 for a 16 bit ISA-compatible bus. If memory for the DMA transfer is located on the same bus, then MEMR#, for an I/O write, and MEMW#, for an I/O read, are generated. In a fourth clock cycle, the bus controller 114 transitions the IOW# or IOR# from the low level state to a high level state. The fourth clock cycle may also be designated as a first clock cycle for a subsequent DMA transfer when the DMA controller is programmed for block or demand mode.

In contrast to the two-clock cycle DMA transfer, the IOW# or IOR# signal remains in a high level state in a fifth clock cycle before subsequent DMA cycles are executed. The high level state in the fifth clock cycle permits interfacing of I/O devices which cannot run the two-clock cycle timing mode but which can run faster than a four-clock cycle timing mode. In addition, the three-clock DMA transfer cycle permits an extra clock cycle for the DMA controller and the bus controller. The fifth clock cycle latency period facilitates hardware implementation. If the DMA controller 110 is in block or demand mode, a subsequent three-clock cycle DMA transfer is initiated on the fourth clock cycle as shown in FIG. 4. The DMA transfer cycle is repeated until the byte/word count is exhausted as indicated by the EOP signal. Similar to the two-clock cycle DMA transfer, the three-clock cycle timing mode provides high performance DMA transfer capability. The three-clock cycle timing is primarily for fast I/O devices, such as an IDE device. The three-clock cycle timing mode runs at 4 SYSCLK cycles, at 480 nanoseconds for a single cycle. In block or demand transfer mode, the three-clock cycle timing runs at 3 SYSCLK cycles, or 360 nanoseconds per cycle.

Figure 5:
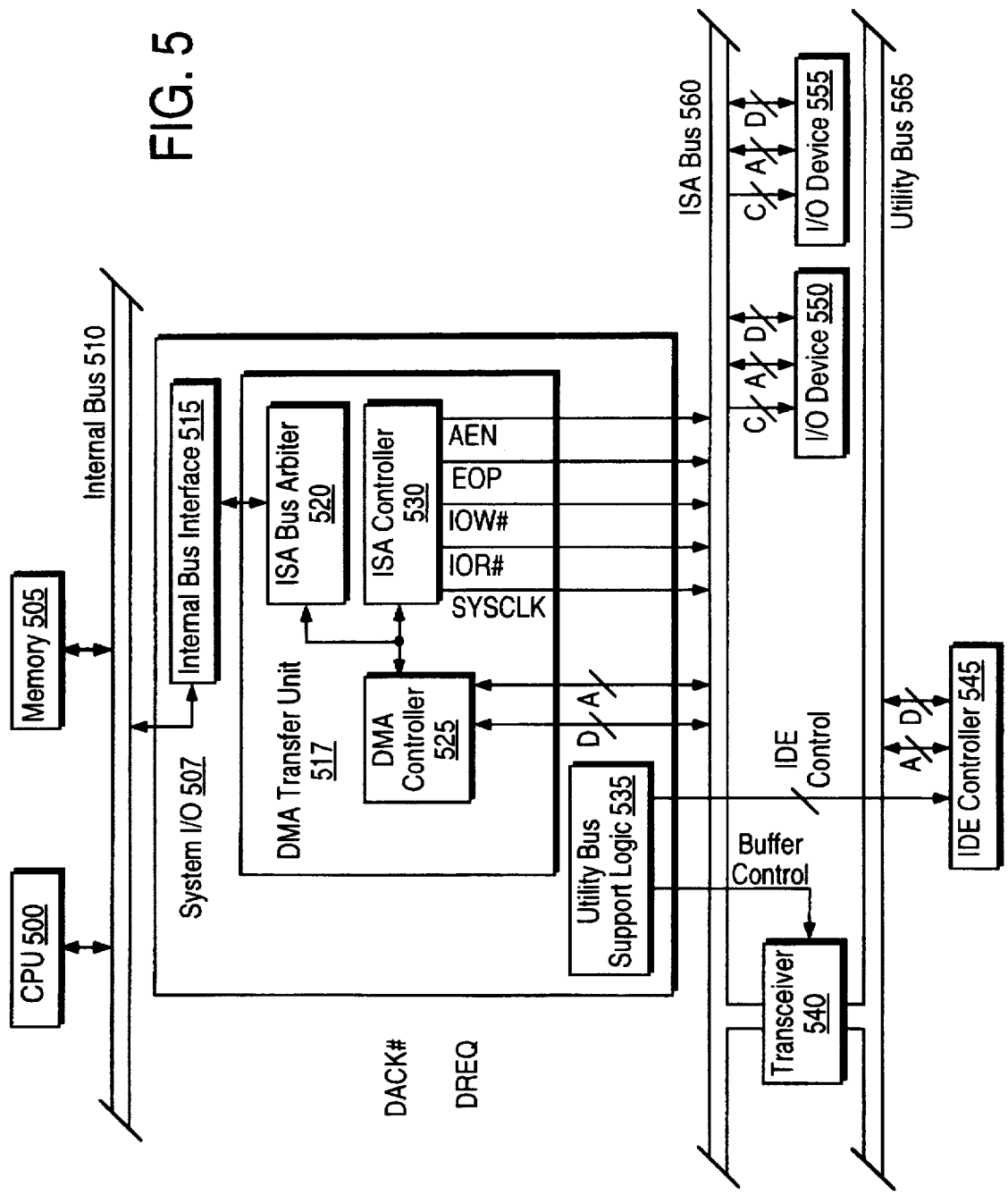
FIG. 5 illustrates a computer system implementing a two-clock cycle and a three clock cycle DMA transfer modes configured in accordance with of the present invention.

Referring to FIG. 5, a computer system implementing a two-clock cycle and a three-clock cycle DMA transfer modes configured in accordance with of the present invention is illustrated. The computer system contains a central processing unit (CPU) 500 and memory 505. In a preferred embodiment, the CPU 500 comprises an Intel® Corporation x86 microprocessor. The CPU 500 and memory 505 are connected to an internal bus 510 such as a peripheral component interconnect (PCI) bus. The computer system also contains an external bus such as an industry standard architecture (ISA) bus 560, and a utility bus 565. The ISA bus 560 contains a plurality of DMA devices, such as I/O device 550 and I/O device 555. A DMA device, comprising an I/O device, is either an 8 or 16 bit device, and is located on the ISA bus. The utility bus 565 comprises a number of standard peripheral components, such as an IDE controller 545 for interfacing an IDE compatible hard drive to the computer system. The IDE controller 545 is also a DMA device. The internal bus 510 and the ISA bus 560 are coupled via a System I/O 507. The System I/O 507 performs a plurality of functions to interface the internal bus 510 with the ISA bus 560 and utility bus 565. In part, the system I/O 507 contains an internal bus interface 515, utility bus support logic 535, and a DMA transfer unit 517. The DMA transfer unit 517 contains a DMA controller 525, an ISA bus controller 530, and an ISA bus arbiter 520. The DMA transfer unit 517 operates in accordance with the DMA transfer unit 108 described above. However, the ISA controller 530 generates bus cycle signals in accordance with the ISA bus specification.

The utility bus support logic 535 provides a direct interface to the IDE controller 545. In general, the utility bus support logic 535 provides buffering, via transceiver 540, from the ISA bus 560 to the utility bus 565. The utility bus 565 is a secondary bus used to interface peripheral devices that do not require a high speed interface. A buffer control is provided by the utility bus support logic 535 to the transceiver 540 to allow data flow to the utility bus 565. In addition, IDE control signals are provided to directly interface the IDE controller 545 via DMA and I/O transfer cycles. For a complete description of the Utility Bus Support logic 535, see system I/O SIO82378IB, revision 1.0, order number: 290473-001, Intel® Corporation, pages 167–172.

In a preferred embodiment of the present invention, each DMA channel on the DMA controller 525 is programmable for any of four transfer modes. The transfer modes include single, block, demand, and cascade. The single, block, and demand modes are active transfer modes and perform three different types of transfers (i.e. read, write, or verify). In the single transfer mode, the DMA is programmed to transfer 8 bit or 16 bit data for one DREQ signal. Before initiation of the DMA transfer cycle, the CPU 500 transfers a byte/word count to the DMA controller 525. The DMA controller 525 decrements the byte/word count following each DMA transfer cycle. The EOP is generated when the byte/word count expires. In the block transfer mode, the DMA controller 525 continues to execute DMA cycles until termination of the byte/word count, or until generation of an external EOP is encountered. In the demand transfer mode, the DMA controller 525 continues executing DMA cycles until a terminal byte/word count or external EOP is encountered, or until the I/O device releases a DREQ signal. In the demand transfer mode, DMA transfer cycles continue until data in the I/O device is exhausted.

The cascade mode for the DMA controller 525 permits linking more than one DMA controller together. Cascading two DMA controllers allows DMA requests of a second DMA controller to propagate through the priority network circuitry of a preceding DMA controller. The cascade mode permits direct access to the system by 16 bit ISA bus masters. For the active modes, the DMA controller 525 performs a write transfer. The write transfer moves data from an I/O device, such as I/O devices 550 and 555, to memory located on either the ISA bus 560 or the internal bus 510. In the write transfer operation, the DMA controller 525 activates the IOR# command signal and the appropriate internal and ISA control signals to indicate a memory write. If the memory is located on the ISA bus 560, then the DMA controller 525 generates the MEMW# command signal.

In addition to write transfers, each active mode also executes read transfers. Read transfers move data from memory, on the ISA bus 560 or internal bus 510, to an I/O device located on the ISA bus 560. The DMA controller 525 activates the IOW# command and the appropriate internal or ISA control signals to indicate a memory read. If the memory is on the ISA bus 560, then the DMA controller 525 generates the MEMR# command signal. The DMA controller 525, operating in the three active modes, also executes verify transfers. The verify transfers are pseudo-transfers in that the DMA controller 525 partially executes a read or write transfer by generating addresses and producing a terminal count. However, the DMA controller does not activate the memory and I/O control lines. In a verify transfer, the DMA controller 525 asserts the appropriate DACK# signal for nine clock cycles. If verify transfers are repeated during block or demand DMA requests, each additional pseudo transfers will add eight clock cycles.

In a preferred embodiment, the DMA controller 525 incorporates the functionality of two 82C37 DMA controllers, with seven independently programmable channels. The DMA channel 4 is used to cascade two controllers and defaults to a cascade mode in the DMA channel mode register. Each DMA channel is programmable for 8 or 16 bit DMA device size and ISA-compatible, Type "A", Type "B", three-clock cycle, or two-clock cycle DMA transfer timing modes. The DMA controller 525 receives commands from the ISA bus arbiter 520 to perform either DMA cycles or refresh cycles. In general, the ISA bus arbiter 520 determines which requester, from among the requesting I/O devices, gains control of the ISA bus 560. The DMA controller 525 is at any time either in master or slave mode. In master mode, the DMA controller 525 is either servicing a request from a DMA slave for DMA cycles, or allowing a 16 bit external ISA master to use the ISA bus 560 via a cascaded DREQ signal. In the slave mode, the system I/O 507 monitors both the internal and ISA busses, and decodes addresses accessing registers in the DMA controller 525 in response to I/O read and write commands.

In a preferred embodiment of the present invention, the ISA bus arbiter 520 uses a three-way rotating priority arbitration scheme. The DMA devices are assigned a rotating priority, and at each priority level the requesting DMA devices are considered equal. When requests from DMA devices result in a fully loaded bus, the ISA bus arbiter 520 grants access to the ISA bus 560 independent of the order the bus requests were made. The bus requests are serviced based on the rotating priority position of the bus requests. The three-way rotating priority bus arbitration scheme ensures that the DMA channels access the ISA bus 560 with minimum latency. In addition, the rotating priority scheme allows for fairness in priority resolution. In operation, the ISA bus arbiter 520 rotates the priority chain so that the last DMA channel serviced is assigned the lowest priority in the particular channel group. The DMA channels 0–3 rotate as a first group of four, and the DMA channels 5–7 rotate as a second group of four.

The DMA controller 525 provides an ISA-compatible timing mode for DMA slave devices. In addition to the two-clock and three-clock cycle timing modes, two additional timing modes are provided for I/O slaves capable of running at faster speeds. Specifically, the DMA controller 525 is programmable for Type "A" and Type "B" timing modes. The Type "A" timing mode allows shorter cycles for DMA transfers to internal memory. The Type "A" timing mode runs at seven system clocks (SYSCLK), or 840 nanoseconds for a single DMA cycle. For block or demand mode DMA cycles, the Type "A" timing mode consists of six SYSCLK cycles or 720 nanoseconds per cycle. The timing for the cycle is based on an 8.33 MHz system clock. The Type "B" timing mode is provided for 8 and 16 bit ISA DMA devices supporting faster I/O timing. Generally, the Type "B" timing mode is only compatible with memory on the internal bus. The Type "B" timing mode runs at 6 SYSCLKs or 720 nanoseconds for a single cycle. For block or demand mode transfer, the Type "B" timing mode runs at 5 SYSCLK cycles or 600 nanoseconds per cycle. Although primarily used for internal memory, the Type "B" timing mode is compatible with some current ISA devices utilizing relatively fast technology.

The Type "A" timing varies from the ISA-compatible timing, primarily in the shortening of the memory operation, to the minimum allowed by system memory. However, the I/O portion of the cycle for Type "A" timing is the same as the I/O portion of the ISA-compatible timing. The actual act of command time is shorter, but DMA devices which provide the data access time or write data set-up time should not require excess IOR# or IOW# command active time. Therefore, most ISA DMA devices should be able to use Type A timing.

In the computer system of the present invention, external memory may reside on either the ISA bus 560 or the internal bus 510. If the memory is on the ISA bus 560, then the DMA cycle runs as an ISA-compatible cycle. Alternatively, if the memory resides on the internal bus 510, the DMA cycle runs as either an ISA-compatible, Type "A", Type "B", three-clock cycle or two-clock cycle timing modes. If memory resides on the internal bus 510, then the DMA controller 525 generates an address identifying the memory for the internal bus. During DMA transfer cycles involving an I/O read, the DMA controller 525 transfers the data read to the internal bus interface 515. If the internal bus is not available to write the data to memory, then wait states are generated until the internal bus is available. The internal bus interface 515 then transfers the data to the memory on the internal bus 510. If the memory resides on the internal bus 510 and the DMA transfer cycle involves an I/O write, then the DMA controller 525 reads the memory on the internal bus via the internal bus interface 515. In a preferred embodiment of the present invention, the I/O devices are located on the ISA bus 560. However, memory devices may be located on either the ISA 560 or internal 510 buses.

The DMA controller 525 comprises a plurality of registers for programming each DMA channel. A DMA command register controls the configuration of the DMA, and a DMA channel mode register provides control over DMA transfer type, transfer mode, address increment/decrement, and auto-initialization. The DMA controller 525 also contains a DMA channel extend mode register for programming the DMA controller 525 for data size, timing mode, EOP I/O selection, and stop register selection. In the present invention, programming for 5 timing modes are available: ISA-compatible, Type "A", Type "B", three-clock cycle and a two-clock cycle. Upon initialization of the computer system, the ROM BIOS program writes to the DMA channel extend mode register. To set-up the DMA channel extend mode register, the BIOS program reads a field on a particular I/O device, which indicates compatible timing mode cycles for which the I/O device supports. Based on the timing information provided by the I/O device, the BIOS program writes values to the DMA channel extend mode register to program the DMA controller 525 to generate the fastest timing cycle for the particular I/O device. The ISA-compatible timing mode is the default setting for all DMA channels.

The two-clock cycle and the three-clock cycle DMA transfers of the present invention has application for interfacing an IDE controller to a computer system. In the preferred embodiment of the present invention, the IDE controller is interfaced to computer system resources via an ISA compatible bus. The IDE specification permits DMA transfers at a rate faster than the four-clock cycle DMA transfer, but slower than a DMA burst mode transfer. Therefore, the two-clock cycle DMA transfer provides fast DMA data transfer that is within the tolerance of the IDE specification. The three-clock cycle DMA transfer also provides a fast DMA data transfer with an IDE controller.

Although the present invention has been described in terms of a preferred embodiment, it will be appreciated that various modifications and alterations might be made by those skilled in the art without departing from the spirit and scope of the invention. The invention should therefore be measured in terms of the claims which follow.

We claim:

1. A method for a direct memory access (DMA) transfer on an industry standard architecture (ISA) compatible bus comprising at least one DMA device, said method comprising the steps of:

generating a bus clock for providing timing for said DMA transfer;

setting-up said DMA transfer on said ISA compatible bus including selecting a DMA device for said DMA transfer and specifying a transfer mode for said DMA transfer during a first clock period;

generating an address during a second clock period specifying a location in memory for a DMA transfer cycle;

asserting a command signal, said command signal comprising an IOW# for an ISA-compatible input/output (I/O) write operation and an IOR# for an ISA-compatible I/O read operation, on said ISA compatible bus during a third clock period for said DMA transfer cycle; and providing data on said ISA compatible bus for said DMA transfer cycle during assertion of said command signal.

2. The method for a direct memory access (DMA) transfer as claimed in claim 1 wherein the step of setting-up said DMA transfer further comprises the steps of:

asserting a DREQ signal to request said DMA transfer on said bus by said DMA device;

generating a transfer request for use of said bus for said DMA transfer;

granting use of said bus for said DMA transfer; and issuing a DACK# signal to said DMA device during said first clock period, said DACK# signal signifying to said DMA device completion of setting-up of said DMA transfer.

3. The method for a direct memory access (DMA) transfer as claimed in claim 1 further including additional DMA transfer cycles, each of said additional DMA transfer cycles being two clock periods in duration, comprising the steps of:

de-asserting said command signal during a fourth clock period;

generating an address specifying a location in memory for an additional DMA transfer cycle during said fourth clock period;

asserting said command signal on said bus during a fifth clock period;

providing data on said bus for said additional DMA transfer cycle during assertion of said command signal.

4. The method for a direct memory access (DMA) transfer as claimed in claim 1 further including additional DMA transfer cycles, each of said DMA transfer cycles being three clock periods in duration, comprising the steps of:

de-asserting said command signal during a fourth clock period;

de-asserting said command signal during a fifth clock period;

generating an address specifying a location in memory for an additional DMA transfer cycle during said fifth clock period;

asserting said command signal on said bus during a sixth clock period; and providing data on said bus for said additional DMA transfer cycle during assertion of said command signal.

5. The method for a direct memory access (DMA) transfer as claimed in claim 1 wherein said DMA device comprises an IDE standard controller.

6. An apparatus for generating a direct memory access (DMA) transfer on an industry standard architecture (ISA) compatible bus comprising:

at least one DMA device coupled to said ISA compatible bus;

bus controller means coupled to said ISA compatible bus for controlling operation of said ISA compatible bus, said bus controller means including a bus clock means for generating a bus clock to provide timing for said DMA transfer, said bus controller means asserting a command signal on said ISA compatible bus during a third clock period for a DMA transfer cycle, said command signal comprising an IOW# for an ISA-compatible I/O write operation and an IOR# for an ISA-compatible I/O read operation; and DMA controller means coupled to said bus controller means and said ISA compatible bus for effectuating a DMA transfer, said DMA controller means comprising a set-up means for selecting a DMA device for said DMA transfer and initializing said DMA device by specifying a transfer mode for said DMA transfer, said DMA controller means generating an address specifying a location in memory for said DMA transfer cycle during a second clock period, and providing data on said ISA compatible bus for said DMA transfer cycle during assertion of said command signal.

7. The apparatus for a direct memory access (DMA) transfer as claimed in claim 6 wherein said set-up means in said DMA controller means further comprises:

bus arbitration means coupled to said bus controller means and also coupled to said DMA controller means for granting control of said bus;

said DMA device asserting a DREQ signal to request a DMA transfer on said bus; and said DMA controller means generating a transfer request for use of said bus for said DMA transfer to said bus arbitration means, and issuing a DACK# signal to said DMA device when granted use of said bus, said DACK# signal signifying to said DMA device completion of setting-up of said DMA transfer.

8. The apparatus for a direct memory access (DMA) transfer as claimed in claim 6 further including additional DMA transfer cycles, each of said additional transfer cycles being two clock periods in duration, comprising:

said bus controller means de-asserting said command signal during a fourth clock period and asserting said command signal on said bus during a fifth clock period for an additional DMA transfer cycle; and said DMA controller means generating an address specifying a location in memory for said additional DMA transfer cycle during said fourth clock period and providing data on said bus for said additional DMA transfer cycle during assertion of said command signal.

9. The apparatus for a direct memory access (DMA) transfer as claimed in claim 6 further including additional DMA transfer cycles, each of said additional transfer cycles being three clock periods in duration, comprising:

said bus controller means de-asserting said command signal during a fourth clock period, said command signal remaining de-asserted during a fifth clock period, and asserting said command signal on said bus during a sixth clock period; and said DMA controller means generating an address specifying a location in memory for an additional DMA transfer cycle during said fifth clock period and providing data on said bus for said additional DMA transfer cycle during assertion of said command signal.

10. The apparatus for a direct memory access (DMA) transfer as claimed in claim 6 wherein said DMA device comprises an IDE-compatible hard drive.

11. An apparatus for generating a direct memory access (DMA) transfer on an industry standard architecture (ISA) bus comprising:

at least one I/O device coupled to said ISA bus;

an ISA bus controller coupled to said ISA bus for controlling operation of said ISA bus, said ISA bus controller receiving a bus clock to provide timing for said DMA transfer, said ISA bus controller asserting a command signal on said ISA bus during a third clock period for a DMA transfer cycle; and a DMA controller coupled to said ISA bus controller and said ISA bus for effectuating a DMA transfer, said DMA controller setting-up a DMA transfer on said ISA bus with an I/O device and specifying a transfer mode for said DMA transfer during a first clock period, said DMA controller generating an address specifying a location in memory for said DMA transfer cycle during a second clock period, and providing data on said ISA bus for said DMA transfer cycle during assertion of said command signal.

12. The apparatus for a direct memory access (DMA) transfer as claimed in claim 11 further comprising:

a bus arbiter coupled to said ISA bus controller and said DMA controller for granting control of said ISA bus;

mode registers within said DMA controller for specifying a transfer mode for said DMA transfer;

DREQ means within said I/O device for asserting a DREQ signal to request a DMA transfer on said ISA bus; and transfer request means within said DMA controller for making a transfer request to said bus arbiter for use of said ISA bus for said DMA transfer, and issuing a DACK# signal to said I/O device when granted use of said ISA bus, said DACK# signal signifying to said I/O device completion of setting-up of said DMA transfer.

13. The apparatus for a direct memory access (DMA) transfer as claimed in claim 11 further including additional DMA transfer cycles, each of said additional transfer cycles being two clock periods in duration, comprising:

said ISA bus controller de-asserting said command signal during a fourth clock period, and asserting said command signal on said bus during a fifth clock period; and said DMA controller generating an address specifying a location in memory during said fourth clock period for an additional DMA transfer cycle and providing data on said ISA bus for said additional DMA transfer cycle during assertion of said command signal.

14. The apparatus for a direct memory access (DMA) transfer as claimed in claim 11 further including additional DMA transfer cycles, each of said additional DMA transfer cycles being three clock periods in duration, comprising:

said ISA bus controller de-asserting said command signal during a fourth clock period, said command signal remaining de-asserted during a fifth clock period, and asserting said command signal on said ISA bus during a sixth clock period; and said DMA controller generating an address specifying a location in memory during said fifth clock period for an additional DMA transfer cycle and providing data on said ISA bus for said additional DMA transfer cycle during assertion of said command signal.

15. The apparatus for a direct memory access (DMA) transfer as claimed in claim 11 wherein said I/O device comprises an IDE-compatible hard drive.

16. A computer system comprising:

processing means;

storage means;

first bus means, wherein said first bus means couples said processing means to said storage means;

direct memory access (DMA) device means for providing functions to said computer system, said DMA device means being interfaced with said computer system via DMA transfers;

second bus means, wherein said second bus means couples a plurality of I/O devices to said computer system; and system input/output (SIO) interface means coupled to said first bus means and said second bus means for interfacing said processing means and storage means to said plurality of I/O devices by generating DMA transfer cycles, said SIO interface means comprising bus controller means coupled to said second bus means for controlling operation of said second bus means, said bus controller means including bus clock means for generating a bus clock to provide timing for said DMA transfer cycles, said bus controller means asserting a command signal on said second bus means during a third clock period;

DMA controller means coupled to said bus controller means and said second bus means for effectuating a DMA transfer, said DMA controller means comprising a set-up means for setting-up a DMA transfer on said second bus means with a DMA device and specifying a transfer mode for said DMA transfer during a first clock period, said DMA controller means generating an address specifying a location in memory for a DMA transfer cycle during a second clock period, and providing data on said second bus means for said DMA transfer cycle during assertion of said command signal; and DMA transfer means for providing additional DMA transfer cycles, each of said DMA transfer cycles being two clock periods in duration.

17. The computer system as claimed in claim 16 wherein said SIO interface means further comprises DMA transfer means for providing additional DMA transfer cycles, each of said DMA transfer cycles, each of said DMA transfer cycles being two clock periods in duration, wherein said bus controller means de-asserts said command signal during a fourth clock period, and asserts said command signal on said second bus means during a fifth clock period, and said DMA controller means generating an address specifying a location in memory for an additional DMA transfer cycle during said fourth clock period for an additional DMA transfer when said DMA transfer is initialized for block or demand mode, and providing data on said second bus means for said additional DMA transfer cycle during assertion of said command signal.

18. The computer system as claimed in claim 16 wherein said SIO interface means further comprises:

mode select means for specifying a transfer mode for DMA transfer; and

DMA transfer means for providing additional DMA transfer cycles, each of said DMA transfer cycles being three clock periods in duration, wherein said bus controller means de-asserts said command signal during a fourth clock period, said command signal remaining de-asserted during a fifth clock period, and asserts said command signal on said second bus means during a sixth clock period, said DMA controller means generating an address specifying a location in memory for an additional DMA transfer cycle during said fifth clock period and providing data on said second bus means for said additional DMA transfer cycle during assertion of said command signal.

19. A computer system comprising:

a central processing unit (CPU);

main memory;

an internal bus coupling said main memory to said CPU;

a plurality of I/O devices for providing a plurality of functions to said computer system, said plurality of I/O devices being interfaced with said computer system via DMA transfers;

an industry standard architecture (ISA) bus, wherein said ISA bus couples said plurality of I/O devices to said computer system; and a system input/output (SIO) interface coupled to said internal bus and said ISA bus for interfacing said main memory to said plurality of I/O devices by generating DMA transfer cycles, said SIO interface comprising:

an ISA bus controller coupled to said ISA bus for controlling operation of said ISA bus, said ISA bus controller receiving a bus clock to provide timing for said DMA transfer cycles, said ISA bus controller asserting a command signal on said ISA bus during a third clock period for a DMA transfer cycle, a DMA controller coupled to said ISA bus for effectuating a DMA transfer, said DMA controller setting-up a DMA transfer on said ISA bus with an I/O device during a first clock period, said DMA controller generating an address specifying a location in memory for said DMA transfer cycle during a second clock period, and providing data on said ISA bus for said DMA transfer cycle during assertion of said command signal; and mode select registers for specifying a transfer mode for DMA transfer cycle.

20. The computer system as claimed in claim 19 wherein said SIO interface further comprises:

a DMA transfer cycle, said DMA transfer cycle being two clock periods in duration, for providing additional DMA transfer cycles, wherein said ISA bus controller de-asserts said command signal during a fourth clock period, and asserts said command signal on said ISA bus during a fifth clock period, and said DMA controller generating an address specifying a location in memory for an additional DMA transfer cycle during said fourth clock period and providing data on said ISA bus for said additional DMA transfer cycle during assertion of said command signal.

21. The computer system as claimed in claim 19 wherein said SIO interface further comprises:

mode select registers for specifying a transfer mode for a DMA transfer cycle; and a DMA transfer cycle, said DMA transfer cycle being three clock periods in duration, for providing additional DMA transfer cycles, wherein said ISA bus controller deasserts said command signal during a fourth clock period, said command signal remaining de-asserted during a fifth clock period, and asserts said command signal on said ISA bus during a sixth clock period, said DMA controller generating an address specifying a location in memory for an additional DMA transfer cycle during said fifth clock period and providing data on said ISA bus for said additional DMA transfer cycle during assertion of said command signal.

22. A method for a direct memory access (DMA) transfer on a bus comprising at least one DMA device, said method comprising the steps of:

generating a bus clock having clock cycles for providing timing for said DMA transfer;

setting up a DMA transfer on said bus including selecting a DMA device for said DMA transfer and specifying a transfer mode for said DMA transfer during a first clock period;

asserting an address on said bus during a first clock period, identifying said DMA device selected;

asserting a command signal on said bus by transitioning said command signal from a first state to a second state during a second clock period for said DMA transfer;

providing data on said bus for said DMA transfer during activation of said command signal;

transitioning said command signal from said second state to said first state during a third clock period to signify termination of said DMA transfer; and deasserting said command signal by transitioning said command signal from said second state to said first state at a fourth clock period, said fourth clock period occurring at a number of clock cycles after the third clock period, the number of cycles after the third clock period depending on the DMA device.

23. The method of claim 22, wherein the fourth clock period occurs two clock cycles after the third clock period.

24. The method of claim 22, wherein the fourth clock period occurs three clock cycles after the third clock period.

25. The method of claim 22, further comprising the steps of:

grouping DMA devices that have been set up during the first clock period such that all DMA devices in a particular group have a common maximum supportable DMA transfer note, the DMA transfer rate being measured in clock cycles; and reasserting and subsequently deasserting the command signal once for each group, such that each group provides data on said bus during a corresponding assertion of said command signal.

26. The method of claim 25, wherein the step of reasserting and subsequently deasserting the command signal occupies a number of clock cycles such that at least one group transfers data during each assertion of said command signal.

* * * * *